Patented Mar. 4, 1941

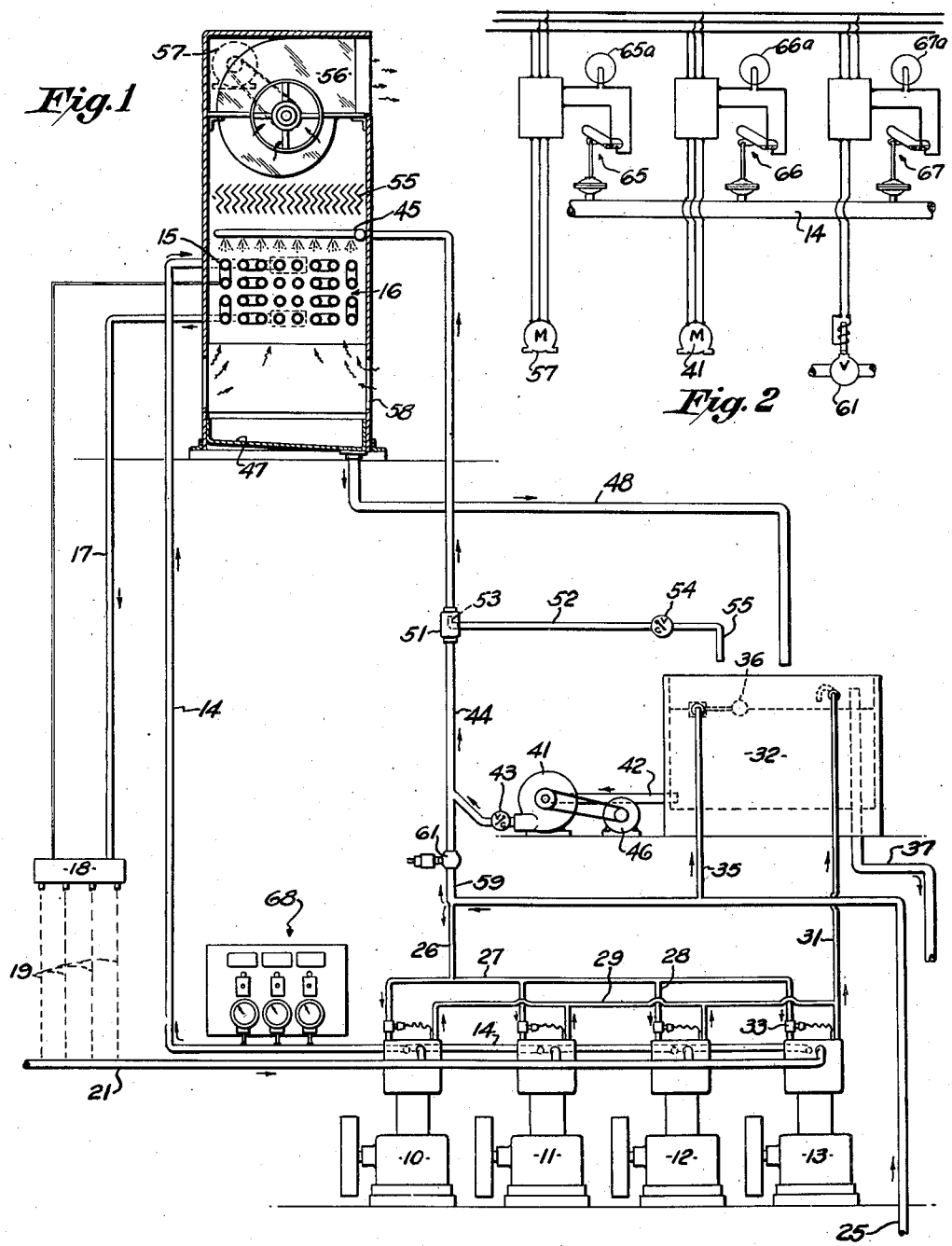

2,233,633

UNITED STATES PATENT OFFICE 2,233,633

REFRIGERATING APPARATUS

Harold J. Mollenberg, Kenmore, N. Y.

Application December 29, 1939, Serial No. 311,561

7 Claims. (Cl. 62—3)

This invention relates to a system of mechanical refrigeration, and it has particular reference to the provision of regulating and control means in a compression-expansion refrigerating system whereby the condensing of compressed refrigerant is effected under varying operating conditions with a minimum of energy.

In the common and well known compression-condensing-expansion system of refrigeration, it has heretofore been proposed to condense the compressed and warm refrigerant vapors by means of an air or water cooled condenser, or by means of a condenser cooled by both air and water. The use of water is indicated because of its higher specific heat, while the use of air is advantageous when the apparatus is of relatively small size, in order to conserve the costs incident to water cooling. Apart from this factor, it is obvious that refrigeration plants must operate under various climatic conditions,—the air temperature may be considerably below freezing, or it may be very warm, and thus the ability of air to absorb heat from the compressed refrigerant is a variable.

In industrial plants, in which air cannot be relied upon for the condenser cooling medium, water is usually supplied from city mains, and must be paid for, or the water is taken from a convenient pond or well, and must be pumped, again involving a factor of cost. In any event, the cost of supplying water to the condensers has long been recognized as significant, and an item which must be taken into account when estimating the initial and operating costs of the system.

Of the various types of water cooled condensers, one frequently specified is that known as the evaporative or atmospheric condenser, in which a shower of water is directed over the pipes forming the condensing coil, while air is inducted or blown over the coil in an opposite direction. The unsaturated air acts to evaporate the water, with a resulting cooling effect, and thus increases the capacity of the air to extract heat from the hot compressed gases flowing through the coil.

Certain difficulties are encountered, however, in using this type of condenser, particularly in installations in which the load is variable. Moreover, even when operating under a substantially constant load, the efficiency of the condenser varies over wide limits, due, among other things, to changes in the temperature and relative humidity of the air, and changes in the temperature of the cooling water. A condensing plant designed to coact effectively with the compressors under anticipated maximum load thus becomes overbalanced when the load is decreased, or overloaded if less condensing capacity is initially specified, with the results of decreasing operating efficiencies, and wasting cooling water and power necessary to operate the water pump and air blower.

In order to eliminate losses of this nature, the present invention contemplates the modification of the overall condenser capacity, and the power input thereto, in response to variations in compressor load and the factors affecting the heat absorption capacity of the cooling media, and this, in a practical way, may be effectively and inexpensively accomplished by controlling, in sequential manner, the quantities of supplied cooling media in response to the compressor head pressure. The effective capacity of the condensing system is, therefore, automatically adjusted to the total load on the compressors, in a manner which regulates the head pressure within those limits at which the compressor is efficient. Not only is a proper thermal balance thereby obtained between the high and low sides of the refrigeration system, but the operating costs for power are considerably reduced, and a full automatic control system permits of reduction of expenses for supervision to a minimum.

A typical embodiment of the invention is illustrated in the accompanying drawing, referred to in the following description explanatory of the principles of the invention, and wherein:

Fig. 1 is a layout of a refrigerating plant utilizing the features hereinafter claimed, and Fig. 2 is a wiring diagram showing a mode of connecting the control instrumentalities into the system.

Referring first to Fig. 1, there are shown four water-cooled compressors, 10, 11, 12, and 13, designed to compress ammonia vapor or other suitable refrigerant, and which are automatically or manually cut into or out of service, depending on the demand of the expansion side of the system. Refrigerant compressed in the compressors is discharged into a manifold line 14 which extends from the compressor room to the coil 15 of an evaporative condenser 16, and which is advantageously located on the roof of the plant, or other convenient point where it is exposed to the air. After being cooled in the condenser, the refrigerant flows through pipe line 17 to a receiver 18, for distribution to the expansion coils 19, and thence through the suction line 21 to the inlet of the compressor, thereby completing the refrigerant circuit.

It will be understood that the expander 19, indicated in dotted lines, may be any type, as for air cooling in an air conditioning circuit, open pipes as in a cold storage room, or pipes submerged in a brine bath for indirect cooling, and the coils may be placed in different rooms or localities. As the load on these coils varies, more or less compressor capacity is demanded, and it is contemplated that the cutting into service of the various compressors shall be made automatically responsive to such load. This type of control is, of course, old and well understood, and does not constitute the essence of the present invention. For that reason, further description will not be made here, it simply being intended to point out how the amount of refrigerant, and hence the compressor capacity, is a variable affecting the duty imposed on the high side of the system, and on which side the regulation of this invention primarily occurs.

The extraction of heat from the compression side of the system is effected by means of both air and water. A water main 25, connected to the city supply lines or a local pumping system or tower, supplies water under pressure to the compressor and condenser. A branch line 26 connects the main 25 to a distributor 27, from which extend lines 28 to admit the water to the jackets of the cylinders of the various compressors 10, 13. The warm water flowing from the cylinder jackets discharges into a collector line 29 connected to a riser 31, which in turn empties into a tank 32 used for recirculating the condenser water. Thus, it will be seen that the compressor cooling water, instead of being run to waste, as is customary, is returned to the system under some conditions of operation, and in fact it may be said that the arrangement is such that the warm compressor water is utilized as the make-up source for the condenser.

Regulation of the cylinder jacket water is effected by thermally controlled pressure responsive valves, which may be of any common and known type. The thermal bulb is, of course, attached to the discharge lines 29, while the valve itself is interposed in the line 28, so that the amount of water supplied to each cylinder jacket is varied in accordance with the load imposed. When a compressor is cut out of service, the water valve 33 therefore is closed, and when the compressor is running, the amount of water supplied is increased as the temperature of the emergent water increases. This is equivalent to saying that the compressor water supply varies with the temperature of the compressed refrigerant, and as this factor also governs the extent to which water is utilized in the condenser 16, it will be apparent that the use of the warm compressor water for condenser make-up purposes is permissible.

The tank 32 is also supplied directly with water from the main 25 through a lateral 35 whose discharge opening is controlled by a float valve 36. If the tank level becomes too low for any cause, the float drops, opening the line 35 to admit water until the desired level is reached, whereupon the line 35 is closed. Any overflow from the tank 32 is discharged through the drain line 37.

Water contained in the tank 32 is admitted to the suction side of a pump 41 through suction line 42, while the pump effluent flows past check valve 43 into a riser 44 which terminates in a spray manifold 45 disposed above the coil 15 of the condenser 16. The pump 41, which is driven by a motor 46 in a manner hereinafter described, thus supplies cooling water to the condenser coils, in accordance with the known principles of operating an atmospheric condenser. The water draining from the coils 15 is collected in a basin 47 for return to the tank 32 through the line 48.

Under some operating conditions, there is a possibility that water contained in exposed portions of this circuit will freeze, and accordingly it is desired to drain the riser 44 and manifold 45 when there is no flow therethrough. The riser 44 is therefore provided with an oversized coupling 51, through which is inserted a tapered pipe 52 whose inner end is bent up, as indicated by the reference numeral 53. The pipe 52 is also provided with a light check valve 54, and a terminal portion 55 leading to the tank 32. When the pump 41 is operated, the suction effect produced by the high pressure water flowing past the tube 53 causes the check valve 54 to close and when the pump is stopped, the column of water in the riser 44 forces the check valve open and permits the riser to drain. This expedient is simple, and it eliminates the necessity for interposing a high pressure valve between the lines 44 and 52.

Mounted above the coils 15 and the customary eliminator plates 55 of the condenser 16 is an air blower or fan 56, driven by a motor 57. The lower portion of the condenser casing is, of course, open, as indicated by the reference numeral 58, so that, when the motor 57 is operated, a draft of air is induced to flow upwardly over the coils 15, to cool the refrigerant contained therein, and for discharge through suitable opening provided at the top of the condenser.

Attention is invited to the fact that the water main 25 is also directly connected to the riser 44 through a branch 59, in which is disposed a solenoid controlled shut-off valve 61. When the valve 61 is open, cold supply water is forced directly into the riser 44. It should be understood that the pump 41 is preferably of the centrifugal type, thus making by-pass connections unnecessary and permitting the pump to supply water from the tank 32 to such extent as the developed head pressure permits. Thus, with valve 61 open, and pump 41 in operation, the water supplied to the coils 15 is a mixture of water from the main 25 and from the tank 32, and may therefore be at a temperature intermediate the temperatures of each source of supply. In other words, a mixed water supply is used under the condition just stated, as a means of conserving the amount of water demanded from the main line 25.

In order to obtain the amount of cooling desired in the condenser, and which must, of course, be proportioned to the duty imposed on the battery of compressors, it may first be noted that condenser cooling media may be of four kinds—namely, natural draft air, circulating through the condenser 16 when all other supplies are cut off; forced draft air supplied by the fan 56; water supplied by the pump 41; and water supplied by the pump 41 and the main 25.

As so listed, these media are approximately in their order of increasing cooling capacity, and they have been so listed to consider them conjointly with the demands imposed on the condensing plant by the compressors. Under conditions of light load in the expansion system, obviously there is a minimum of refrigerant, in terms of mass or quality, to be cooled and condensed, and operation of the condensing plant at full capacity would therefore render the compressor performance erratic and inefficient. As more refrigerant is circulated, an increasing demand is imposed on the condensing plant. Broadly considered, it may therefore be said that the present invention contemplates the continuous modulation of the condensing plant, to provide for it that capacity best suited to the duty imposed on or by the compressors.

The compression of the refrigerant is reflected practically, by an increase in pressure and tem perature, and for efficient operation, it is desirable to maintain the discharge or condensing pressure within reasonably close limits. If, for example, the condensing plant is unable to cool the compressed refrigerant properly, the apparent result is an increase in pressure. Accordingly, the modulation of the condensing plant is made responsive to step by step changes in the pressure existing in the compressor discharge line 14.

For this purpose, the line 14 is tapped to receive the pressure connections for three pressure-operated mercoid switches, 65, 66, and 67, which are located respectively in the circuits for the fan motor 57, the water pump motor 41, and the solenoid valve 61. Inasmuch as the circuits themselves are standard, and are made with the usual commercial starting boxes and the like, no detailed description is deemed necessary. It is sufficient to say that the mercoid switches close when the pressure in the line 14 reaches various predetermined values, and when the switches are thrown the circuits in which they are disposed are closed, thus energizing the motor located in each circuit.

Each control circuit is moreover provided with a signal lamp, 65a, 66a, and 67a, so that the attendant can determine the operation of the system merely by glancing at the instrument board 68.

The pressure elements for these switches are so adjusted, by way of example, that when the pressure in the line 14 is below a certain value, say 135 pounds gauge, all of the switches are open, and there is neither a forced draft of air or flow of water over the coils 15 of the condenser. When the head pressure reaches this predetermined value, the switch 65 is closed, thus completing the circuit for the air blower motor 57, and causing a blast of air to be inducted through the vent 58. When the head pressure increases to say 150 pounds, the switch 66 is closed, thus adding to the cooling capacity the results obtained by forcing water through the spray nozzles 45, by operation of the motor 46. If through any circumstance the head pressure should continue to rise, to say 180 pounds, then the third switch 67 is also closed to excite the solenoid valve 61, thereby opening the valve and admitting additional quantities of colder water from the main 25.

Conversely, as the pressure is reduced by the action of the condenser, the solenoid valve is set to close at a pressure of say 170 pounds, and the switch 66 in turn is set to open when the pressure drops to say 140 pounds. The switch 65 may be set within somewhat closer limits, as for example 130 pounds—these ranges being obtained, of course, by setting of the high and low stops constituting a part of the switches themselves. It will thus be seen that the condensing plant capacity is biased toward excess capacity after the capacity has been called into service, in order to reduce the head pressure more rapidly, but the extra capacity is not called into play until conditions warrant it.

The operation of the system may be further considered for an installation such as a brewery, in which the expansion coil load is subject to wide variations, located in a relatively northern community, where the air temperature may vary from below zero Fahrenheit in the winter to ninety degrees in the summer. With such variations, it is of course obvious that the quality of cooling air changes considerably, and, in winter weather, the cold air itself, either when flowing over the coils 15 by simple convection, or through induced draft, may extract as much heat from the compressed refrigerant as warmer air and water could in mid-summer. For another operating condition, one may consider a hot summer day, with a high relative humidity and an appreciable increase in the temperature of the cooling water, and which may, of course, be coupled with a heavy load on the expansion coils. In such case, a condensing plant designed to operate always on forced air draft and water spray can become overloaded, as shown by the rise in head pressure, and therefore means have been provided to introduce the coldest available water to the system, despite the possible increased overflow loss.

For any set of conditions, however, reliance is placed on using the cheapest cooling medium to its fullest capacity, before calling into service the next cooling medium. This is made possible by controlling the application of the various media in a step-by-step method, in accordance with increases in refrigerant high side pressures, and herein the invention differs from older systems, in which the entire condensing capacity was intermittently either called in, or was cut out of service.

Analyses of installations made in accordance with the invention have showed that considerable savings in cost of cooling water and power, together with some reduction in the size of the condensing plant, are effected with the present invention. In fact, even when water is supplied directly from the main 25, its heat absorption capacity is conserved by returning it to the tank 32, rather than to waste—the waste water in such case being partially composed of the warmer water localized in the tank 32.

It will, of course, be understood by those skilled in the art that the various control instrumentalities referred to herein may be of the common and usual known types, and that hand valves or switches may be interposed in the various refrigerant, water, and electric circuits as good engineering practice may indicate. Such auxiliaries form no part of the present invention, however, as it has been one purpose here to describe the invention in its most effective form in a fully automatic installation. It will moreover be appreciated that while the invention has been described with reference to one specific embodiment, variations and modifications may be made within the scope thereof, as encompassed by the following claims.

I claim:

1. In a refrigerating apparatus including a compressor, a condenser coil, and an evaporator connected in a closed circuit, means for admitting cooling water to the compressor, a storage tank, means for discharging water flowing from the compressor to said tank, means for supplying cooling water to the surface of the condenser coil including a pump taking its supply from said tank, valve means for controlling the quantity of water supplied to the compressor, said valve means being responsive to the temperatures existing in the compressor, and means responsive to the pressure existing at the compressor for controlling the operation of said pump.

2. In a refrigerating apparatus including a compressor, a condenser coil, and an evaporator connected in a closed circuit, a supply of water, pump means for admitting water from the supply to the surface of the condenser coil, a riser pipe connected to said pump for conveying the discharge thereof to said coil surface, drain means for returning the discharged water to the supply during the operation of the pump, and auxiliary drain means hydraulically connecting the riser pipe to the supply for draining said pipe only when the pump is out of operation.

3. In a water cooled refrigerating system including a compressor, a condenser coil, and an evaporator connected in a closed circuit, means for recirculating cooling water around the condenser coil, said means including a local storage tank, a pump, a discharge line from the pump to the surface of the coil, a drain for returning water discharged by the pump to the tank, and an overflow drain for the tank; valve means for admitting make-up water to the tank from an extraneous source; other valve means for admitting water from said extraneous source to said condenser coil surface directly thereby to admit water to said recirculating means at a point other than said tank, whereby water admitted directly from said extraneous source to the condenser coil surface is mixed with recirculating water contained in said tank, and water escaping from said overflow drain is mixed water from said extraneous source and said recirculating circuit.

4. In a refrigerating apparatus including a compressor, a condenser coil, and an evaporator connected in a closed circuit, and wherein there is provided, in combination with said coil, means for supplying convection currents of air, a forced draft of air, and water to the surface of said coil for cooling refrigerant contained therein, blower means for creating the forced draft of air, pump means for supplying the water, means for operating each of the blower means and pump means independently of each other, means responsive to a predetermined pressure condition in excess of minimum operating pressure conditions in the refrigerant line connecting the compressor and condenser coil for controlling the operation of the blower means, and means responsive to predetermined pressure conditions in said refrigerant line higher than said first-named pressure condition for controlling the operation of said pump means, whereby the condenser coil is cooled by the sequential application of convenction air, forced draft air, and water in response to progressive increases in the pressure of refrigerant between the compressor and condenser coil.

5. In a refrigerating apparatus including a compressor, a condenser coil, and an evaporator connected in a closed circuit, and wherein variations in the load imposed on the evaporator change the work done by the compressor, means for varying the cooling capacity of the condenser coil in response to pressure conditions existing in the refrigerant between the compressor and the condenser coil, said last named means comprising: means for supplying convection currents of air to the surface of the condenser coil, a blower for supplying a forced draft of air to said surface, a motor for operating the blower, a switch responsive to predetermined pressure conditions in the hot refrigerant for opening and closing the circuit for the blower motor, a local supply of cooling water, a pump for spraying the cooling water over the surface of the coil, a motor for operating the pump, and a switch also responsive to pressure conditions in the hot refrigerant for opening and closing the circuit for the pump motor, said last named switch operating to close the pump motor circuit upon the occurrence of pressure conditions in excess of the condition at which the blower motor operates, and means for admitting make-up water to the local supply of cooling water in response to the extent to which the pump motor is operated and the local water supply is thereby diminished in heat extraction quality.

6. In a refrigerating apparatus including a compressor, a condenser coil, and an evaporator connected in a closed circuit, and wherein the evaporator is subject to varying loads and the hot refrigerant flowing through the condenser coil is subject to heat exchange with both air and water of variable quality, means for regulating the supply of cooling media to the surface of the condenser coil in response to variations in the evaporator and compressor load and the change in quality of the cooling media; said regulating means comprising: means for supplying a convection current of air to the surface of the condenser coil, a motor-driven blower for supplying a forced draft of air, a local supply of water and a motor-driven pump for supplying water therefrom to the surface, and an extraneous supply of water for said surface; the convection air supplying means being operative under all conditions of operation, pressure-responsive electrically actuated means for independently controlling the operation of the motor-driven blower, the motor-driven pump, and the extraneous water supply, said electrically actuated means being sequentially operated by rising pressure in the refrigerant circuit between the compressor and the condenser coil in step-by-step order.

7. In a refrigerating apparatus including a water-cooled compressor, a condenser coil subject to air and water cooling, and an evaporator connected in closed circuit, means for supplying forced draft air to the surface of the condenser coil when the refrigerant pressure between the compressor and coil reach a predetermined range of values, a water tank containing water, a pump, a spray pipe and a drain line hydraulically connected in a local closed circuit for supplying water to the surface of the condenser coil, means responsive to higher refrigerant pressures for operating the pump and thereby the flow of water in said local circuit, means for supplying water from an extraneous source to the compressor, a pipe for conducting water flowing from the compressor to said tank, a float valve controlled line for admitting water directly from the extraneous source to the tank, a valved connection for admitting water from said extraneous source directly to the spray pipe, means for operating said last named valved connection to admit water therethrough upon the occurrence of pressure conditions in the refrigerant between the compressor and the condenser coil in excess of the presure conditions at which the water pump is operated, and an overflow line from the tank to remove excess quantities of water introduced into the local circuit from said extraneous source.

HAROLD J. MOLLENBERG.